US007359921B1

(12) United States Patent
Richards

(10) Patent No.: US 7,359,921 B1
(45) Date of Patent: Apr. 15, 2008

(54) SYSTEM AND METHOD FOR RAPIDLY GENERATING IDENTIFIERS FOR RECORDS OF A DATABASE

(75) Inventor: Adam Richards, Concord, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 682 days.

(21) Appl. No.: 10/812,594

(22) Filed: Mar. 29, 2004

Related U.S. Application Data

(63) Continuation of application No. 09/527,627, filed on Mar. 16, 2000, now Pat. No. 6,714,948.

(60) Provisional application No. 60/131,666, filed on Apr. 29, 1999.

(51) Int. Cl.
*G06F 17/00* (2006.01)
*G06F 17/30* (2006.01)
(52) U.S. Cl. .................. 707/200; 707/100; 707/101
(58) Field of Classification Search .................. 707/200
See application file for complete search history.

(56) References Cited

U.S. PATENT DOCUMENTS

| 6,643,642 | B1 | 11/2003 | Habegger |
| 6,647,386 | B2 | 11/2003 | Holliness et al. |
| 6,647,393 | B1 | 11/2003 | Dietterich et al. |

OTHER PUBLICATIONS

State restoration in real-time systems LihChyun Shu; Chang-Ming Tsai; Real-Time Computing Systems and Applications, 1999. RTCSA '99. Sixth International Conference on Dec. 13-15, 1999 pp. 4-12.*

A Survey of Distributed Database Checkpointing; Journal of Distributed and Parallel Databases ISSN 0926-8782 (Print) 1573-7578 (Online) Issue vol. 5, No. 3 / Jul. 1997 pp. 289-319.*

Recovery of mobile transactions Gore, M.M.; Ghosh, R.K.; Database and Expert Systems Applications, 2000. Proceedings. 11th International Workshop on Sep. 4-8, 2000 pp. 23-27.*

De La Puente, Mejia-Alvarez; Predictability and Responsiveness of Fault Recovery Operations in Real-Time Systems; Proc. $18^{th}$ IEEE Real Time Systems Symposium, work in progress sessions, pp. 15-18, 1997.* http://www.cio.com.au/index.php/id;77645788;fp;;fpid;;pf;1 dated Jul. 7, 2000.*

(Continued)

*Primary Examiner*—David Y Jung
(74) *Attorney, Agent, or Firm*—Innovation Partners; Charles E. Gotlieb

(57) ABSTRACT

A method and apparatus generates identifiers of database records apart from the database. One or more application programs may request an identifier of a transaction, and a stored identifier of a prior transaction is incremented or otherwise altered to produce the identifier of the transaction. The identifier is provided to the application program, which uses it as an identifier of a record of a database if such a record is created. If a system failure occurs, the database is scanned to identify the most recently issued identifier stored in the database, for example by requesting from the database the highest transaction number stored, and that number is used to generate the next transaction number.

30 Claims, 3 Drawing Sheets

OTHER PUBLICATIONS

The OKS persistent in-memory object manager Jones, R.; Mapelli, L.; Ryabov, Y.; Soloviev, I.; Nuclear Science, IEEE Transactions on vol. 45, Issue 4, Part 1, Aug. 1998 pp. 1958-1964.*

Adaptive parallel identification of dynamical systems by adaptive recurrent neural networks Lo, J.T.; Bassu, D.; Neural Networks, 2003. Proceedings of the International Joint Conference on vol. 2, Jul. 20-24, 2003 pp. 914-918 vol. 2.*

Working with persistent objects: to swizzle or not to swizzle Moss, J.E.B.; Software Engineering, IEEE Transactions on vol. 18, Issue 8, Aug. 1992 pp. 657-673.*

Bhide et al., A case for fault-tolerant memory for transaction processing, Fault-Tolerant Computing, 1993, FTCS-23, Digest of Papers, The Twenty-Third International Symposium on Jun. 22-24, 1993, pp. M451-460.

Houben et al., Retrieval of volatile database output through hypermedia applications, System Sciences, 1999, HICSS-32, Proceedings of the 32$^{nd}$ Annual Hawaii International Conference on, Volume: Track5, Jan. 5-8, 1993.

Schmidt et al., Lean language and models: towards an interoperable kernel for persistent object systems, Research Issues in Data Engineering, 1993: Interoperability in Multi database Systems, 1993, Proceedings RIDE-IMS '93, Third International Workshop.

* cited by examiner

SYSTEM AND METHOD FOR RAPIDLY GENERATING IDENTIFIERS FOR RECORDS OF A DATABASE

RELATED APPLICATIONS

This application is a continuation of application Ser. No. 09/527,627 entitled, "Method and System for Rapidly Generating Identifiers for Records of a Database" filed by Adam Richards on Mar. 16, 2000 now U.S. Pat. No. 6,714,948, which claims the benefit of U.S. Provisional Application No. 60/131,666 entitled, "Method and Apparatus for Rapidly Generating Unique Identifiers" filed Apr. 29, 1999 by Adam Richards, each application having a common assignee as this application and each application is hereby incorporated herein by reference in its entirety.

FIELD OF THE INVENTION

The present invention is related to computer software and more specifically to computer software for generating identifiers.

BACKGROUND OF THE INVENTION

A database may be used to store information arranged in multiple records. Many conventional databases allow the database programmer to request the database to generate a serial number or other identifier for each record in the database. The database generates a number for the record that is a certain number higher than the number of the last record. For example, the database may be programmed so that each record receives an identifier that is one higher than the identifier generated for the prior record. Identifiers are not limited to numbers: they may actually contain a combination of letters and numbers.

Some databases allow application programs to direct some or all of their operations. The application programs use the database for storage and retrieval of information for example, using conventional SQL commands or other similar commands. This speeds development of the applications because the functionality associated with the database need not be recreated by each application.

A central database that supports multiple applications can solve difficult problems. For example, it may be desirable to ensure that a customer who initiates two transactions over the Internet is assigned two transaction numbers, with the transaction number of the transaction that was initiated earliest being lower than the transaction number of the later transaction. Such an arrangement may be required by regulatory authorities, such as the U.S. Securities and Exchange Commission. Because many independent applications, each running on separate web servers, may be used to process the transactions, a central database can supply the identifiers in the proper order. The web servers can request the central database to create a new record at the time each transaction is initiated. The central database issues an identifier to each record as it is created. The database stores the identifier in the database record for use as a record identifier, and supplies the identifier to the application. The identifier is supplied to the user of the application for use as a transaction number. Because the central database supplies the identifiers for all of the web servers, a customer who requests a transaction on one web server and then requests a second transaction on a second web server is assured of receiving identifiers matching the order of the time of initiation of the transaction.

The order of the identifiers need not correspond to initiation of the transaction: if it is desirable that the order of the identifiers match another event, such as submission of an order, each database record can be created at that time to ensure the order of the identifiers matches the order of the events.

In addition to providing identifiers, a database can help protect the data it stores from corruption. For example, databases create logs on a hard disk that can be used to roll back the database to a state at a particular point in time, undoing any changes made after that point in time. If a problem is detected, the roll back facilities of the database may be used to return the database to a prior state that did not contain the problem. The use of the disk means that even if volatile storage such as memory is lost, for example during a power failure, the database may be rolled back to the time just prior to the time at which the power failed, and restarted with only a minor loss of data.

When a database that creates one or more hard disk logs is used to generate identifiers, problems may result. Because of the time it takes to create the disk records that can be used to roll back one or more transactions, using a database to provide the identifier of each record can cause a delay in the operation of the application programs because the database will require a prior record to be stored to disk before the database can issue a new identifier based on the number of the prior record. If identifiers are requested faster than the database can store the logs onto the disk, the speed of operation of the application programs may be reduced.

What is needed is a system and method that can rapidly provide an ordered set of identifiers for database records.

SUMMARY OF INVENTION

A system and method generates and stores identifiers in memory at memory speeds, then provides each identifier generated to one or more of several application programs. The system and method may generate the identifiers as part of a conventional operating system of a computer system, allowing a serial number to be obtained using an API call to the operating system. The identifiers are provided to, and stored in, a database as the applications require. If the system fails, for example, due to a power failure, the database may be requested to provide the latest identifier stored, and the method and apparatus generate subsequent serial numbers using this latest identifier.

DETAILED DESCRIPTION OF A PREFERRED EMBODIMENT

Figure 1:
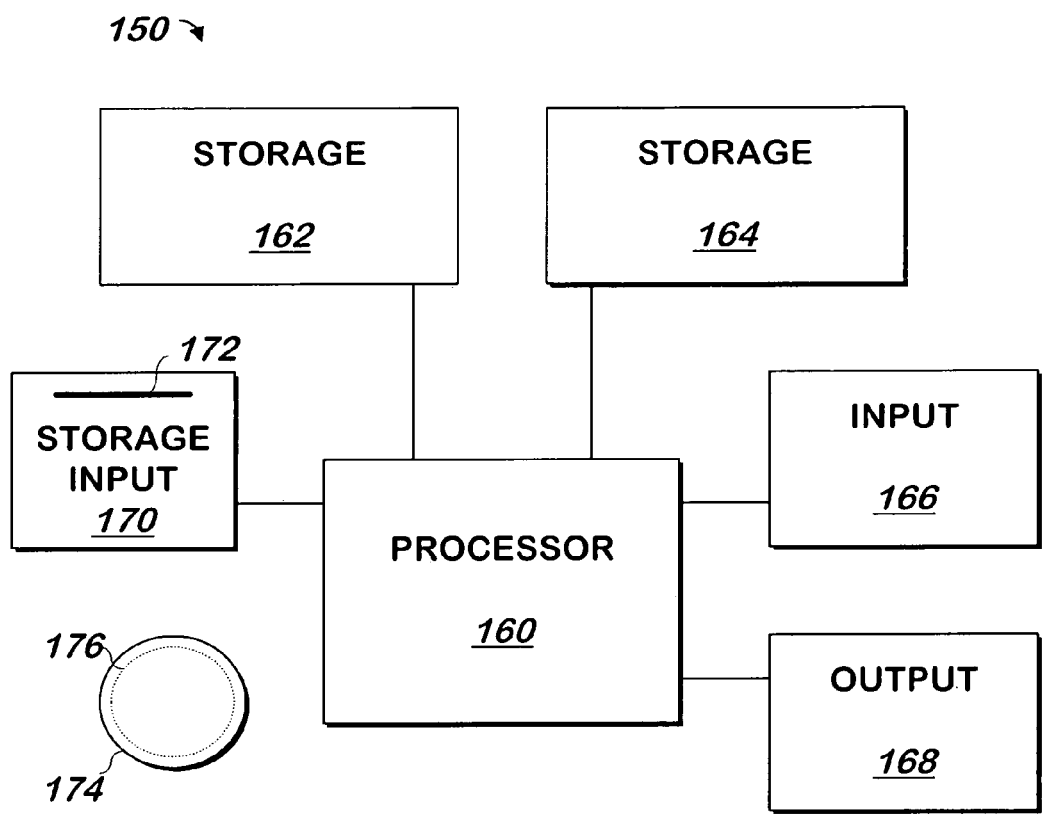
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Removable media read or read/write device 170 such as a conventional floppy disk drive or CD-R or CD-RW drive accepts via input 172 computer program products 174 such as a conventional floppy disk or CD-ROM or any other storage media that may be used to transport computer instructions or data to the system 150. The computer program product 174 and device 172 may be integrated, such as with a removable hard drive. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional S/390 compatible computer system running the CICS/ESA Transaction Monitor commercially available from International Business Machines Corporation of White Plains, N.Y., although other systems may be used.

Figure 2:
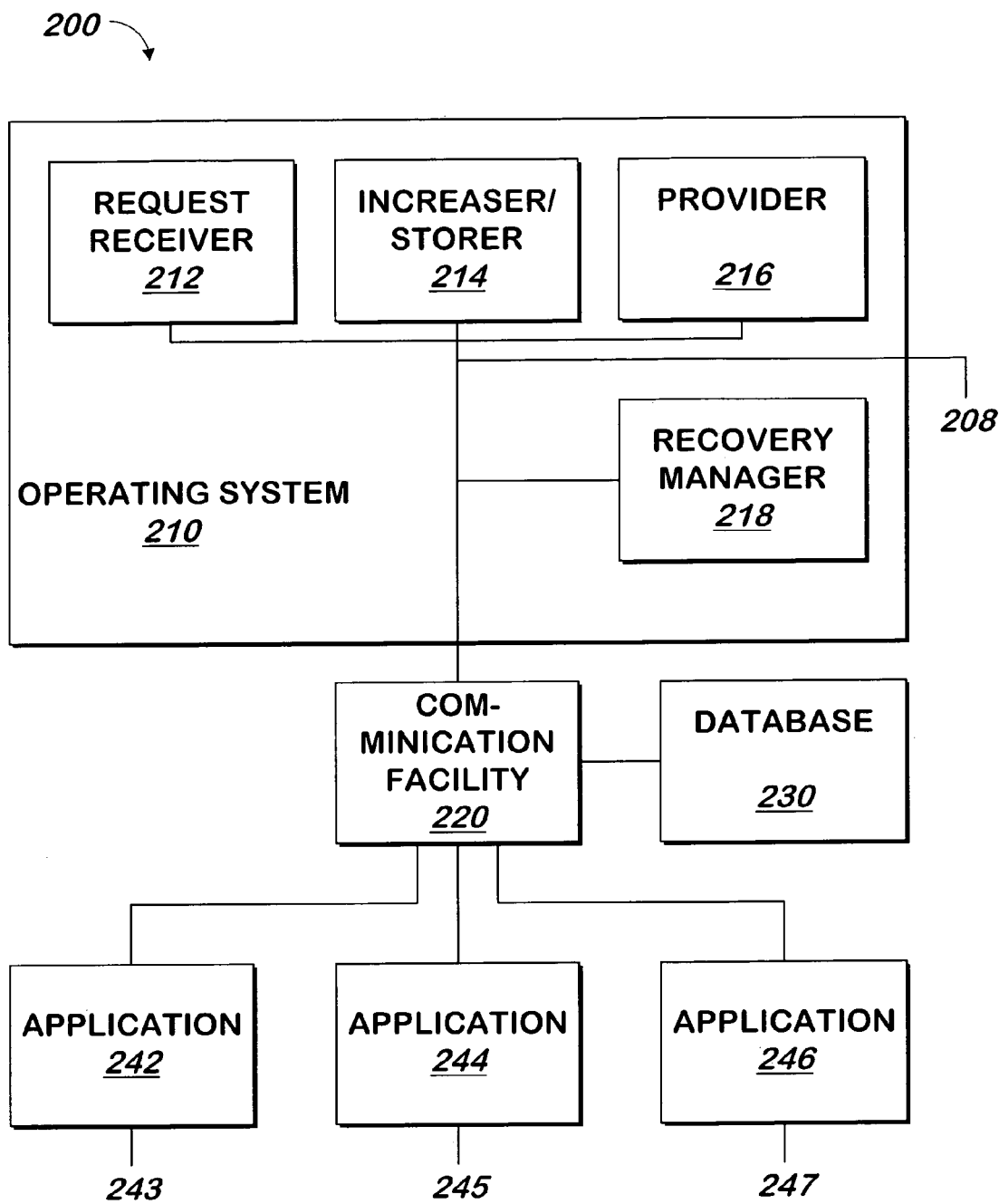
FIG. 2 is a block schematic diagram of a system for providing identifiers for records of a database according to one embodiment of the present invention.

Referring now to FIG. 2, a system 200 for providing identifiers of database records is shown according to one embodiment of the present invention. Application programs 242, 244, 246 interact with database 230 by requesting new records and providing data to the new records requested. Application programs 242, 244, 246 may be any conventional application program. Database 230 is any conventional database program, such as the conventional DB2 program commercially available from IBM Corporation of White Plains, N.Y., the conventional Oracle 8i program commercially available from Oracle Corporation of Redwood Shores, Calif., or the conventional SQL Server program commercially available from Microsoft Corporation of Redmond, Wash. Database 230 stores certain information to disk for data recovery purposes. Database 230 does not allow the generation of an identifier based on a prior-generated identifier, such as would be useful in generating a series of identifiers in an order, until a disk operation is completed related to the prior-generated identifier.

Communication facility 220 is any conventional communication interface, such as the communication facility described above. Operating system 210 is the conventional CICS/ESA transaction Monitor described above.

When an application 242, 244 or 246 wishes to request an identifier, for example, to process a new transaction that may result in a new record being requested in database 230, application 242, 244 or 246 signals request receiver 212. The identifier may identify the transaction, a database record or both. The database record need not be requested until a later time, such as when a customer confirms the transaction. Each identifier may have an order, such as the alphanumeric order of an alphanumeric serial number.

Request receiver 212 signals increaser/storer 214, which increments an identifier stored solely in volatile storage such as RAM and provides it to provider 216. The identifier is stored solely in volatile storage to prevent the delays associated from storing it to the disk or other nonvolatile storage that may be in place for data recovery of the database. The identifier may be stored separately from the data in the database or as part of it as long as the identifier is not placed in a record or other portion that must be stored to disk before the identifier may be changed for storage in another record.

Provider 216 provides the identifier to the requesting application 242, 244 or 246 via communication facility 220. The application 242, 244, 246 may store the identifier as part of a record, which it has requested in database 230. In this manner, the identifier may be used to identify the record in database 230.

Each application 242, 244 or 246 may provide the identifier via input/output 243, 245, 247 for example, to a customer to use as a reference of the transaction. In one embodiment, such transaction numbers are provided to the customer as part of a confirmation web page using the Internet.

In one embodiment, request receiver 212, increaser/storer 214 and provider 216 are a part of operating system 210. The request received by request receiver 212 corresponds to an application programming interface call that is received by operating system 210 and provided to request receiver 212.

In one embodiment, operating system 210, database 230, application 242, application 244, application 246 reside on one or more different computer systems. Although three applications 242, 244, 246 and one database 230 are shown in the Figure, any number of applications 242, 244, 246 and database 230 may be used in other embodiments of the present invention. Each application 242, 244, 246 may be a different application or the same as one or all of the others.

In one embodiment, recovery manager 218 is capable of setting the value of the identifier stored by increaser/storer 214 upon a signal received by any of operating system 210, application 242, 244 or 246. Operating system 210 may provide this signal upon restarting, for example after a power failure. Alternatively, operating system 210 may provide this signal in response to a request provided at input/output 208 coupled to a conventional input/output device such as a conventional keyboard/mouse/monitor combination.

Recovery manager 218 responds to the signal by requesting from database 230 the last identifier, such as the highest value identifier it presently stores. In one embodiment, it is possible for identifiers to be reused, thus recovery manager 218 requests from database 230 the highest value identifier it received during a particular period. If database 230 or application 242, 244, 246 assigns each record a timestamp corresponding to the time the record was created, the time the transaction was initiated or a different time, identification of the record with the last identifier issued during a period that includes the approximate failure date and time can help to eliminate higher identifiers issued much earlier than the approximate failure date and time. Recovery manager 218 provides this value to increaser/storer 214. Increaser/storer 214 stores the result in place of the identifier it currently stores.

Although the discussion above describes incrementing the value of the identifier by increaser/storer 214, increaser/storer 214 may increase the value of the identifier by any amount, including a negative amount.

In one embodiment, each record stored in database 230 corresponds to a transaction, such as a transaction for purchase, sale or other disposition or acquisition of any right. In one embodiment, the transaction corresponds to a transaction for purchase or sale of a conventional security, such as a stock or option.

Figure 3:
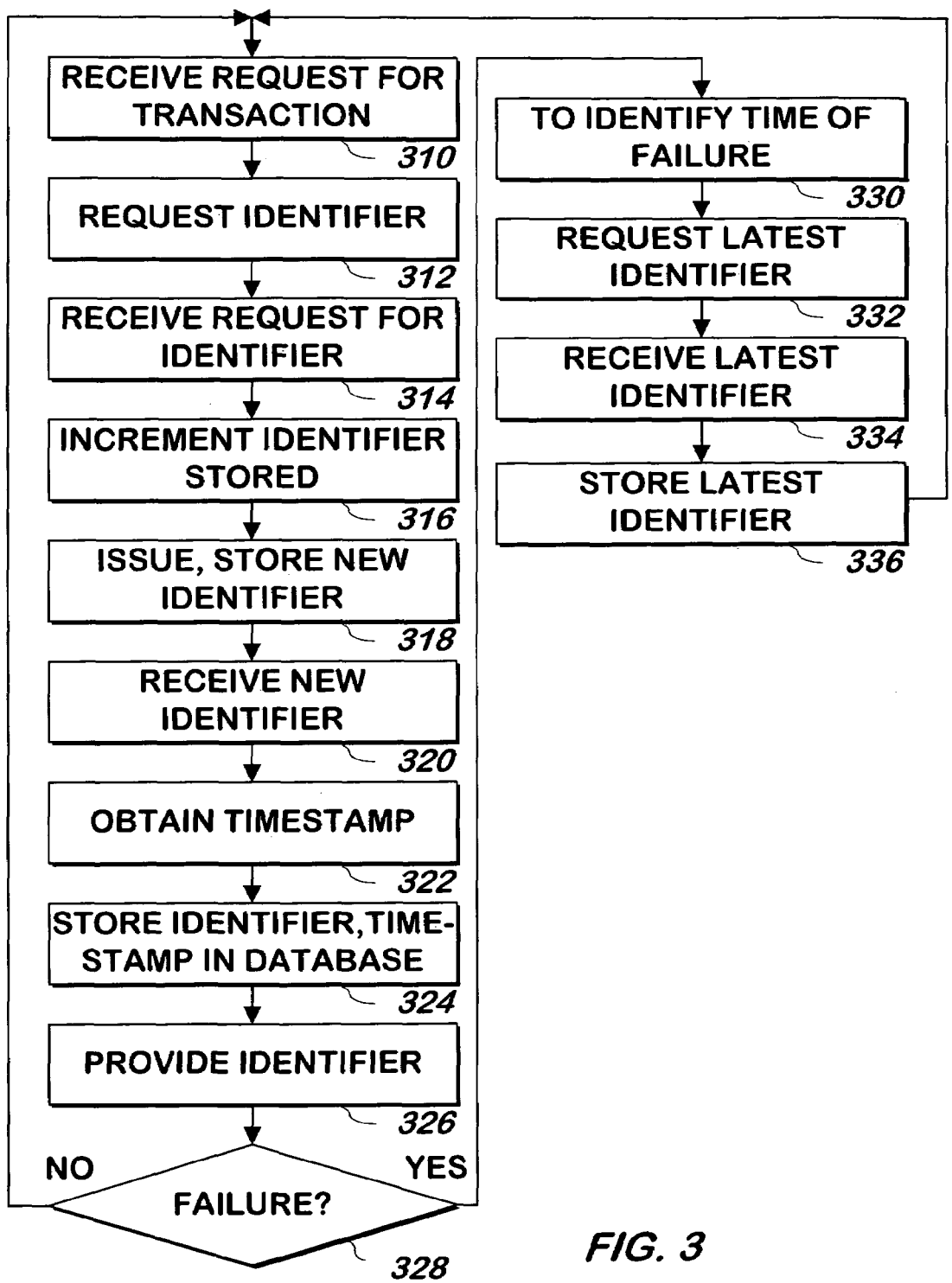
FIG. 3 is a flowchart illustrating a method of generating and recording identifiers in a database according to one embodiment of the present invention.

Referring now to FIG. 3, a method of generating and recording identifiers in a database is shown according to one embodiment of the present invention. A request for transaction is received 310. In one embodiment, the transaction is a transaction for purchase, sale or other acquisition or disposition of rights, such as the purchase of a security or option. An identifier is requested 312. The identifier may be used to identify a transaction, such as the one requested in step 310, a database record that either exists or will exist, or any of these. The request in step 312 may be made to operating system, for example using a conventional applications programming interface call, or the request may be made to an application program.

The request for the identifier is received 314 and a prior identifier issued, having been stored in steps 318 or 336 is incremented or otherwise changed in value 316, for example by adding 1, −1 or any other value. The new identifier is issued and stored 318.

The new identifier is received 320 and a timestamp is optionally obtained 322. The identifier and timestamp are stored in a database 324, for example as part of a record including other information about the transaction. The identifier may be provided 326, for example to a customer to use as a reference number for the transaction.

If a system failure does not occur 328, the method continues at step 310. If a system failure occurs 328, the time of failure may be optionally identified 330. A latest identifier, such as the highest or lowest identifier) in the database into which records were stored in step 324 is requested 332. The latest identifier may be a highest identifier corresponding to one or more timestamps as described above. The latest identifier is received from the database 334 and stored 336, so that the identifier changed in step 316 will be the identifier received in step 334.

What is claimed is:

1. A method of providing an identifier of a database record, the method comprising:
    receiving a request for the identifier of the database record;
    generating a first value responsive to a second value stored solely in volatile storage; and
    responsive to the receiving the request step, providing the first value for use as the identifier of the database record.

2. The method of claim 1 wherein the receiving and generating and providing steps are performed by an operating system.

3. The method of claim 2 wherein the operating system comprises CICS/ESA.

4. The method of claim 1 wherein the providing the first value step comprises providing the first value to an application program prior to any storage of the first value in a database as an identifier of the database record.

5. The method of claim 1 wherein the database record corresponds to at least one transaction.

6. The method of claim 5 wherein the transaction involves a security.

7. The method of claim 1 additionally comprising:
    requesting the second value from the database; and
    receiving from the database the second value requested; and
    storing the second value received.

8. The method of claim 7 wherein the value is requested by requesting one selected from a highest record identifier and a lowest record identifier.

9. The method of claim 7 wherein the value is requested responsive to at least one timestamp.

10. The method of claim 9 wherein at least one of the at least one timestamp corresponds to a failure.

11. A computer program product comprising a computer useable medium having computer readable program code embodied therein for providing an identifier of a database record, the computer program product comprising computer readable program code devices configured to cause a computer system to:
    receive a request for the identifier of the database record;
    generate a first value responsive to a second value stored solely in volatile storage; and
    responsive to the computer readable program code devices configured to cause the computer system to receive the request, provide the first value for use as the identifier of the database record.

12. The computer program product of claim 11 wherein the computer readable program code devices configured to cause the computer system to receive and generate and provide comprise an operating system.

13. The computer program product of claim 12 wherein the operating system comprises CICS/ESA.

14. The computer program product of claim 11 wherein the computer readable program code devices configured to cause the computer system to provide the first value comprise computer readable program code devices configured to cause the computer system to provide the first value to an application program prior to any storage of the first value in a database as an identifier of the database record.

15. The computer program product of claim 11 wherein the database record corresponds to at least one transaction.

16. The computer program product of claim 15 wherein the transaction involves a security.

17. The computer program product of claim 11 additionally comprising:
    computer readable program code devices configured to cause the computer system to request the second value from the database; and
    computer readable program code devices configured to cause the computer system to receive from the database the second value requested; and
    computer readable program code devices configured to cause the computer system to store the second value received.

18. The computer program product of claim 17 wherein the computer readable program code devices configured to cause the computer system to request the value comprise computer readable program code devices configured to cause the computer system to request one selected from a highest record identifier and a lowest record identifier.

19. The computer program product of claim 17 wherein the computer readable program code devices configured to cause the computer system to request the value are responsive to at least one timestamp.

20. The computer program product of claim 19 wherein at least one of the at least one timestamp corresponds to a failure.

21. A system for providing an identifier of a database record, the method comprising:
    a request receiver having an input operatively coupled for receiving a request for the identifier of the database record, the request receiver for signaling at an output responsive to the request received at the request receiver input;

an increaser/storer for generating a first value responsive to a second value stored solely in volatile storage and for providing the first value at an output; and a provider for receiving the first value at an input coupled to the increaser/storer output and for providing at an output coupled to a database input the first value for use as the identifier of the database record.

22. The system of claim 21 wherein the request corresponds to an operating system applications programming interface call.

23. The system of claim 22 wherein the operating system comprises CICS/ESA.

24. The system of claim 21 wherein the increaser/storer generates the first value by adding an additional value to the second value.

25. The system of claim 21 wherein the database record corresponds to at least one transaction.

26. The system of claim 25 wherein the transaction involves a security.

27. The system of claim 21:

wherein the increaser/storer additionally comprises a value input for receiving the second value, the increaser/storer additionally for storing the second value received at the value input; and additionally comprising a recovery manager for:

providing at an output a request for a set of at least one value comprising the second value;

receiving at an input coupled to the database the set of at least one value; and providing at a value output coupled to the increaser/storer value input the second value.

28. The system of claim 27 wherein the request provided by the recovery manager corresponds to a request for at least one selected from a highest record identifier and a lowest record identifier.

29. The system of claim 27 wherein the recovery manager additionally comprises a timestamp input for receiving at least one timestamp, each of the at least one timestamp comprising at least one selected of an indicator of a time and an indicator of a date, and the recovery manager requests the set of at least one value responsive to the at least one of the at least one timestamp received at the timestamp input.

30. The system of claim 29 wherein at least one of the at least one timestamp corresponds to a failure.

* * * * *